US008831554B2

(12) United States Patent
Choi-Grogan et al.

(10) Patent No.: US 8,831,554 B2
(45) Date of Patent: *Sep. 9, 2014

(54) MANAGEMENT OF A MULTI-APPLICATION MOBILE CARRIER TREE

(71) Applicant: AT&T Mobility II LLC, Atlanta, GA (US)

(72) Inventors: Yung Shirley Choi-Grogan, Issaquah, WA (US); Arthur Brisebois, Cumming, GA (US); Kurt Huber, Kennesaw, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 93 days.

This patent is subject to a terminal disclaimer.

(21) Appl. No.: 13/913,040

(22) Filed: Jun. 7, 2013

(65) Prior Publication Data

US 2013/0273925 A1    Oct. 17, 2013

Related U.S. Application Data

(63) Continuation of application No. 12/026,721, filed on Feb. 6, 2008, now Pat. No. 8,483,650.

(51) Int. Cl.
*H04B 1/06* (2006.01)
*H04L 5/00* (2006.01)
*H04W 72/04* (2009.01)
*H04W 72/12* (2009.01)

(52) U.S. Cl.
CPC ............. *H04W 72/04* (2013.01); *H04L 5/0058* (2013.01); *H04L 5/0007* (2013.01); *H04L 5/0089* (2013.01); *H04W 72/1205* (2013.01); *H04L 5/0039* (2013.01)
USPC ........... 455/352; 455/446; 455/450; 370/320; 370/342

(58) Field of Classification Search
USPC ............ 455/23, 450, 453, 352; 370/208, 229, 370/254, 328–330, 342, 352
See application file for complete search history.

(56) References Cited

U.S. PATENT DOCUMENTS 6,560,194 B1     5/2003   Gourgue et al.
6,754,251 B1     6/2004   Sriram et al.
7,016,319 B2 *   3/2006   Baum et al. ................... 370/329

(Continued)

OTHER PUBLICATIONS

Office Action dated Oct. 21, 2010 for U.S. Appl. No. 12/026,721, 19 pages.

(Continued)

*Primary Examiner* — Christian Hannon
(74) *Attorney, Agent, or Firm* — Amin, Turocy & Watson, LLP

(57) ABSTRACT

Efficient utilization and management of integrated mobile base station carrier trees is provided herein. Such trees provide an organizational structure for allocating calls in a code division, tone division, time division and/or like mobile infrastructure. Calls can be allocated to portions of the carrier tree as a function of characteristic(s) associated with the call. Accordingly, like calls are grouped within the carrier tree with like calls. In addition, portions of the carrier tree can be re-allocated to different types of traffic to meet fluctuations in traffic demand. Further, calls can be re-packed from existing segments of the carrier tree to other segments to maintain calls having common characteristics in contiguous groups, and to maintain idle segments another contiguous group(s). Accordingly, the wireless carrier tree can be packed and managed more efficiently, providing greater throughput and reduced contention for resources.

20 Claims, 11 Drawing Sheets

(56) References Cited

U.S. PATENT DOCUMENTS

| | | | |
|---|---|---|---|
| 7,020,176 B2* | 3/2006 | Heo | 375/130 |
| 7,929,496 B2* | 4/2011 | Gorokhov et al. | 370/329 |
| 8,483,650 B2* | 7/2013 | Choi-Grogan et al. | 455/352 |
| 2001/0055299 A1* | 12/2001 | Kelly | 370/352 |
| 2003/0081584 A1 | 5/2003 | Heo | |
| 2003/0157887 A1* | 8/2003 | Willenegger | 455/23 |
| 2003/0210660 A1* | 11/2003 | Wiberg et al. | 370/320 |
| 2004/0131008 A1* | 7/2004 | Zuniga et al. | 370/208 |
| 2005/0007974 A1* | 1/2005 | Vasudevan et al. | 370/320 |
| 2005/0070295 A1* | 3/2005 | Horanieh | 455/453 |
| 2006/0193304 A1* | 8/2006 | Breuer et al. | 370/342 |
| 2007/0019536 A1 | 1/2007 | Hamalainen et al. | |
| 2007/0115875 A1* | 5/2007 | Toskala et al. | 370/328 |
| 2007/0268959 A1* | 11/2007 | Bi et al. | 375/146 |
| 2008/0069066 A1* | 3/2008 | Mansour | 370/342 |
| 2008/0084843 A1* | 4/2008 | Gorokhov et al. | 370/330 |
| 2008/0095050 A1* | 4/2008 | Gorokhov et al. | 370/229 |
| 2008/0198763 A1* | 8/2008 | Fischer et al. | 370/254 |
| 2010/0069077 A1* | 3/2010 | Hu et al. | 455/450 |
| 2010/0222071 A1* | 9/2010 | Tafreshi et al. | 455/453 |
| 2010/0290405 A1* | 11/2010 | Arnott et al. | 370/329 |
| 2010/0309954 A1* | 12/2010 | Odenwalder | 375/140 |

OTHER PUBLICATIONS

Office Action dated Mar. 11, 2011 for U.S. Appl. No. 12/026,721, 23 pages.

* cited by examiner

MANAGEMENT OF A MULTI-APPLICATION MOBILE CARRIER TREE

CROSS-REFERENCE TO RELATED APPLICATIONS

The subject application is a continuation of U.S. patent application Ser. No. 12/026,721, entitled "MANAGEMENT OF A MULTI-APPLICATION MOBILE CARRIER TREE," filed on Feb. 6, 2008, and issued as U.S. Pat. No. 8,483,650, the entirety of which is incorporated herein by reference.

BACKGROUND

In recent years, a vast increase in public and private utilization of mobile electronic communication has occurred. As use of mobile communication devices and mobile communications services increase, the demand placed on mobile network components to provide remote communication services for such devices and subscribers increases commensurately. To compound this problem, today's mobile devices (e.g., mobile phones, personal digital assistants [PDAs], etc.) can be utilized as full-service computing mechanisms. For example, many of the most recent and advanced mobile devices can be associated with word processing software, web browsing software, electronic mail software, accounting software, and various other types of software. In general, applications heretofore available only by way of computing devices and/or Internet protocol (IP) based network devices are now available on such mobile devices. This expansion in capability of mobile devices has also lead to advancements in processing capability of mobile network resources. As an example, mobile base stations and control components have begun to process voice and data traffic concurrently on a single processing architecture.

Rapid growth of the telecommunications industry has fueled a strong competition for market share in mobile-IP communication devices and communication service plans. Because of such competition, mobile network providers have created packet based data networks that can provide IP access to the Internet and other IP-based network resources and applications (e.g., e-mail, web browsing, and so on). Accordingly, a mobile handset, or a like device, can provide access to a rich assortment of shared computing applications and data resources available via such networks. However, not all packet based data communications utilize a common data rate or common quality of service. On the contrary, various service providers provide for a range of bandwidths or data rates for IP-based subscriber traffic.

In addition to the foregoing, communication link quality and data rate reliability requirements can vary from application to application. For instance, web-browsing traffic is often provided as a best effort service; available bandwidth is allocated to such traffic, but where high traffic volume occurs less bandwidth is allocated to such traffic. In contrast, some applications, including streaming audio or video, voice over Internet Protocol (VoIP), and the like, perform best when a constant data rate and low channel jitter is provided. Accordingly, service providers often provide highly reliable or guaranteed data rates for such applications.

Due to the various requirements of different applications, some mobile providers maintain different wireless carriers for different types of traffic. However, this can be inefficient in circumstances where call volume as a function of application type is difficult to predict. Accordingly, other mobile service provides integrate wireless carriers to handle various applications concurrently. Thus, in such carriers, circuit-switched calls and packet-switched data calls, of varying bandwidths, data rates, link quality, and so on, can be serviced by a single carrier. Although such an arrangement can provide added efficiency, additional management requirements can also arise.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

The subject disclosure, in one or more aspects, provides for efficient utilization and management of integrated wireless carrier trees. Such trees provide an organizational structure for servicing various types of mobile calls by way of a common wireless bandwidth associated with the carrier tree. Calls can be allocated to portions of the carrier tree as a function of characteristic associated with the call. Accordingly, like calls are grouped within the carrier tree with like calls. Such a mechanism enables the wireless carrier tree to be packed more efficiently, providing greater utilization of bandwidth on average.

According to some aspects, un-assigned segments of a carrier tree can be maintained in a particular portion of the tree. For instance, un-assigned segments can be maintained between portions of the tree that are dedicated to two different types of traffic. As a result, additional calls of either type of traffic can be allocated to an un-assigned block(s) that is contiguous to blocks assigned to like traffic type. By maintaining contiguity of like types of traffic within a carrier tree, un-assigned segments of the tree are less likely to be fragmented, enabling efficient packing of the carrier tree.

In accordance with still other aspects, segments of a carrier tree can be re-allocated from one traffic type to another to meet fluctuations in call demand. For instance, if a wireless carrier receives a large spike of incoming voice calls, segments of a carrier tree assigned to data calls can be re-allocated to voice calls. Once the increased volume subsides, the re-allocated calls can be re-assigned to service data calls, as suitable. Accordingly, management of a wireless carrier tree as a function of traffic type can be performed flexibly to meet scalability demands of incoming calls.

According to still other aspects, calls assigned to a wireless carrier can be dynamically re-packed within a carrier tree. For instance, where call fragmentation occurs as a result of call drops (e.g., various calls randomly being ended), calls can be re-assigned to various segments to maintain calls of a common traffic type in contiguous portions of the carrier tree. Un-assigned segments can also be maintained in a single contiguous portion. Accordingly, by re-packing calls to maintain like calls in contiguous portions of the carrier tree, a higher portion of bandwidth of an integrated carrier tree, on average, can be utilized at a given point in time.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and

DETAILED DESCRIPTION

Figure 1:
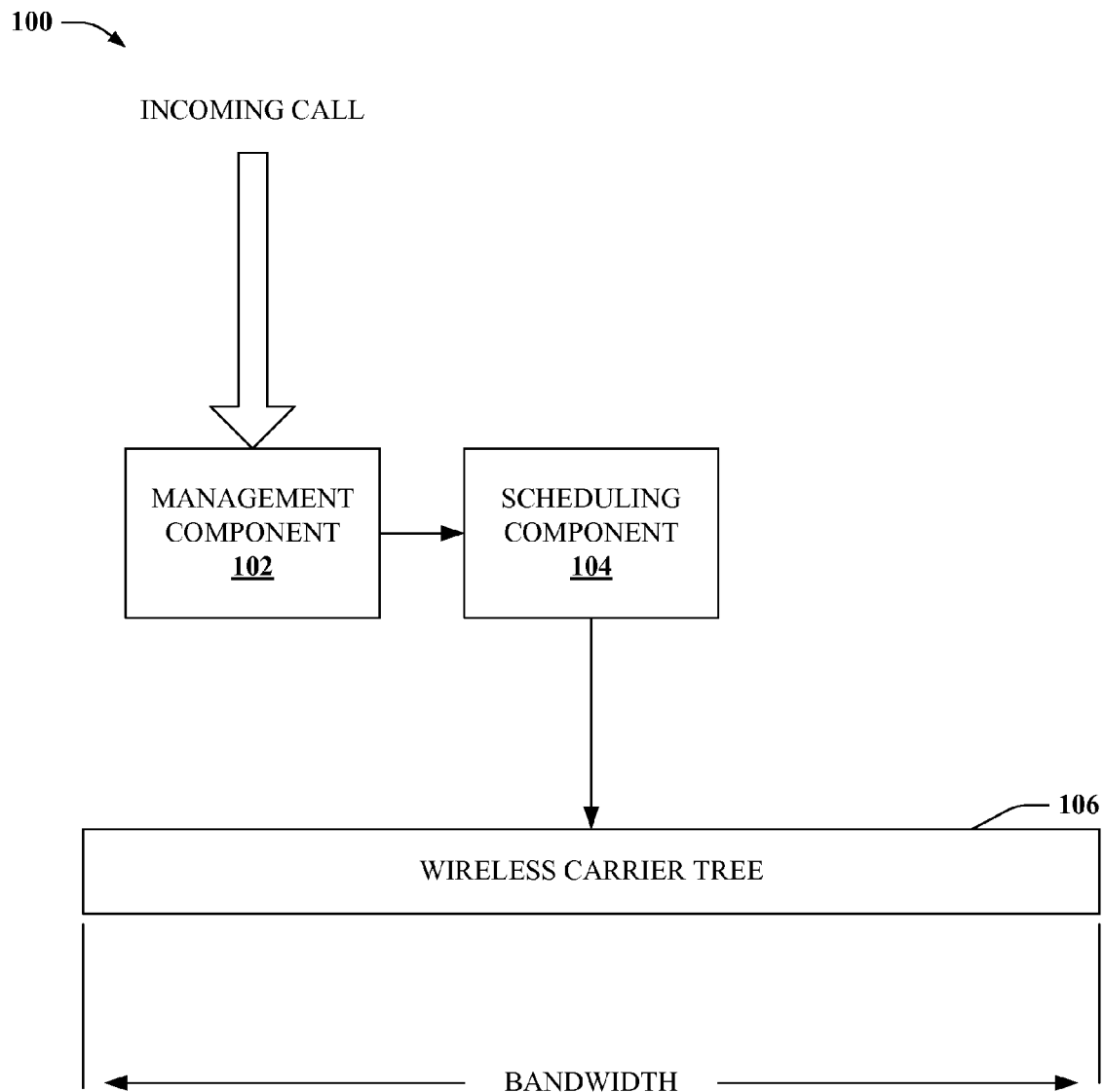
FIG. 1 depicts a block diagram of an example system that provides efficient management of a wireless carrier tree according to some aspects.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

As used in this application, the terms "component," "system," "equipment," "interface", "network," and/or the like are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

The subject disclosure provides for efficient management of integrated wireless carrier trees. A wireless carrier tree is an organizational structure (e.g., see FIGS. 3 and 4, infra) utilized to assign multiple wireless calls to air resources of a wireless carrier. The wireless carrier can be a code division multiple access (CDMA) technology, where calls are assigned distinguishable codes (e.g., orthogonal codes), an orthogonal frequency division multiplex (OFDM) technology, where calls are assigned distinguishable frequency tones, or like code and/or tone wireless communication technology.

A wireless carrier tree is generally split into multiple code or tone segments, where each segment corresponds to a fraction of an overall bandwidth and data rate available to a wireless carrier. Typical tree segmentation occurs in layers, with a spreading factor associated with segments of each layer. The spreading factor indicates a fraction of available carrier tree bandwidth available to each segment on a particular layer. For instance, a wireless carrier's entire bandwidth is un-segmented and having spreading factor 1 (SF1). A second layer has 2 segments of SF2, each with one half of the carrier's bandwidth and data rate. A third layer has 4 segments of SF4, each with one fourth of the carrier's bandwidth and data rate. The various segments are distinguished by way of distinguishable codes or tones, as suitable to the carrier's technology, assigned to signals on each segment. In general, a bandwidth of a segment having spreading factor 'x', or SFx, will be equal to B/x, where B is the total bandwidth of the carrier.

A number of segment layers of a wireless carrier tree can correspond to a total bandwidth associated with the carrier and a minimum bandwidth applicable to a single type of call. As a non-limiting example, if a carrier has 5 MHz total bandwidth, and the minimum bandwidth required by a single call is 12.5 KHz (e.g., a circuit-switched voice call), a carrier tree for such a carrier can be split into 9 segment layers, from SF1 at the top layer to SF256 at the bottom layer. As discussed above, an SF1 block has the total bandwidth, B/x, of the carrier (e.g., 5 MHz in this instance), and an SF256 block has B/x bandwidth, or 5 MHz divided by 256=approximately 19.5 KHz. Although an SF256 segment has more bandwidth than required for the 12.5 KHz call, the next smaller layer, at SF512, would have approximately 9.75 KHz of bandwidth, which is insufficient to handle the call. Accordingly, SF256 is the largest spreading factor capable of handling 12.5 KHz calls for a 5 MHz carrier.

Allocation of calls to a carrier tree is relatively straightforward when a carrier services only a particular type of wireless communication (e.g., circuit-switched communication or packet-switched communication). For instance, if a carrier handles only circuit-switched voice calls, under nominal circumstances a 5 MHz carrier can handle up to 256 such calls at a time, on SF256 segments, as described in the example above. Since each call requires only a single SF256 segment, calls can be allocated to any available segment of the carrier tree.

Data calls can be a bit more problematic since such calls can have various bandwidth and data rate requirements. For instance, high quality data traffic such as streaming video can require a relatively low, but guaranteed bit rate. Other data calls, such as web browsing traffic, download/upload traffic, e-mail, and the like, can perform optimally with much higher data rates, but can also be served with fluctuating data rates without much concern. Because data calls can have different data rates, they are typically allocated to one or more portions of a code tree, at various layers. For instance, a 128 KHz data call can be allocated to a single SF 32 segment (e.g., having approximately 156 KHz). Accordingly, the data call also utilizes the resources of the sub-segments of the SF32 segment, specifically 8 SF256 segments, 4 SF128 segments, and 2 SF64 segments. A very large data call, 2 MHz in bandwidth, could be assigned to a single SF2 segment of the carrier tree, as long as all of the sub-segments that correspond to the SF2 segment are available. Note, however, that a second SF2 call cannot be accommodated concurrently with the SF32 call and the SF2 call, since the second SF32 segment of the carrier tree has a sub-segment allocated to the 128 KHz call (e.g., one of 16 SF32 segments associated with the second SF2 segment). As illustrated, a data carrier can service varying numbers of data calls before reaching capacity, depending on requirements of each call.

It is also pertinent to note a single call generally is serviced by contiguous segments. For instance, a data call requiring two SF8 segments cannot be served by one SF8 segment at one end of a carrier tree and another SF8 segment at an opposite end of the carrier tree. The call should be served by two contiguous SF8 segments. Accordingly, fragmentation of a carrier tree represents a particular problem for data call carrier trees that does not occur with circuit-switched voice carrier trees (or, e.g., any carrier tree serving calls having a very narrow variation in bandwidth). Specifically, if available carrier tree segments are not maintained in a contiguous portion of the carrier tree, larger data calls can be un-serviceable, even though a total available bandwidth of the carrier can accommodate the data call.

For integrated carrier trees that can service multiple-data rate calls, fragmentation of available segments typically leads to an inability to support larger data rate calls. Conventional carrier tree scheduling assigns calls starting from one end of a carrier tree toward an opposite end, until the carrier tree is full. However, because calls can drop out randomly, carrier trees often become fragmented. If data rates of incoming calls are all within a narrow range, assignment of new calls simply requires identifying the newly available segments. Where incoming calls have data rates that vary, assignment of new calls involves identifying a sufficient number of available contiguous segments to provide a required data rate. In other words, a carrier typically will wait to assign a call until an available number of contiguous segments are available to service the call.

As a particular example, an integrated carrier that can handle both small data rate voice calls and high data rate web-browsing or download calls can become fragmented relatively often. The voice calls are typically scheduled to a single small segment of the carrier tree. Large data calls can be scheduled to varying numbers of segments. As the voice calls drop out randomly, available segments will result at random points in the carrier tree. Subsequent voice calls can often be allocated to these segments, but many times data calls cannot until a sufficient number of contiguous available segments occur. Accordingly, a need exists for more efficient scheduling to mitigate fragmentation of available carrier tree segments (e.g., occurrence of non-contiguous available segments) and to manage fragmentation due to random call drops.

The subject disclosure provides improved management of carrier tree segments to mitigate segment fragmentation, increase carrier tree packing efficiency, and/or decrease resulting carrier tree fragmentation. In some aspects, portions of a carrier tree can be allocated to calls as a function of traffic type. For instance, one or more portions can be allocated as a function of type of call (e.g., voice calls, data calls, circuit-switched calls, packet-switched calls, and so on), type of call service (e.g., voice service, broadband data service, streaming service), type of call application (e.g., streaming video, streaming audio, voice over Internet Protocol [VoIP], mobile conference call), or quality of service (e.g., guaranteed bit rate [GBR] services, high quality low demand services, high demand services, and so on). As a particular example, a first portion of a carrier tree and associated radio resources can be allocated to guaranteed bit rate calls. Such guaranteed bit rate calls can be allocated starting at one end of the first portion. A second portion of the carrier tree and associated radio resources can be allocated to a shared pool of packet data calls. High demand (e.g., high bandwidth or high data rate) calls with low quality priority can be allocated to one end of the shared pool (e.g., an end that is adjacent the first portion allocated to guaranteed bit rate calls) and a second end of the shared pool, opposite the one end, can be allocated to low demand calls. In addition, a third portion of the carrier tree and associated radio services (e.g., at an opposite end of the carrier tree from the first portion) can be allocated to circuit switched voice calls. By allocating calls to portions of the carrier tree as a function of quality, service, application, and/or the like, contention for resources can be reduced for high quality/priority calls. In addition, when low demand and/or low bit rate calls drop out, fragmentation is reduced with respect to high demand and/or high bit rate calls, enabling a greater number of carrier tree segments to be allocated at a given time.

In some aspects, portions of a carrier tree allocated to particular types of calls can be re-allocated to meet increased demand. For instance, if an increase in guaranteed bit rate calls occurs, and carrier tree segments allocated to such calls are filled, idle carrier tree segments within the carrier tree can be re-allocated to guaranteed bit rate calls. In further aspects, a radio access bearer (RAB) associated with the idle carrier tree segments can be reconfigured to best support guaranteed bit rate calls. Surplus guaranteed bit rate calls can be assigned to the re-allocated carrier tree segments to meet increased demand of such calls. If demand decreases at a subsequent time, the re-allocated segments can be configured to other types of calls (e.g., high bit rate, low quality calls, low bit rate high quality calls, and so on).

According to further aspects, idle carrier tree segments can be maintained in one or more portion(s) of a carrier tree. For instance, if a portion is allocated to voice calls, idle segments of the portion can be preserved for future voice call demand. In other aspects, idle segments of the carrier tree can be maintained in a particular portion of the carrier tree. For instance, in at least one aspect, idle portions can be maintained in the middle of the carrier tree, or at one end, or the like.

In still other aspects, re-packing of calls currently serviced by a carrier tree can be provided. For instance, a call serviced by one segment can be transferred to another segment of the carrier tree mid-call. In some aspects, re-packing can be performed to maintain calls of a particular type, application, service, quality, etc., in contiguous segments of the carrier tree. As an example, if three adjacent segments are serving three low bit rate applications, and a call allocated to a middle of the three segments drops out, a call allocated to one of the adjacent segments can be re-packed into the middle segment. Accordingly, the remaining low bit rate applications are served by contiguous, adjacent segments. In other aspects, re-packing can be affected to maintain idle segments in a contiguous portion(s) of the carrier tree. Accordingly, as calls drop out of the carrier tree, remaining calls serviced by the carrier tree can be re-packed into one or more contiguous portions such that idle segments are also maintained in one or more contiguous portions of the carrier tree.

As described herein, the subject disclosure provides for improved efficiency for mobile carrier tree allocation. In addition, greater throughput for wireless base stations utilizing such carrier trees to organize wireless transmission resources (e.g., air transmission resources) can be achieved.

Such wireless base stations can serve more users and applications on average, while reducing resource contention for high priority and/or high demand (e.g., high bit rate) applications.

In addition to the foregoing, it should be appreciated that the claimed subject matter can be implemented as a method, apparatus, or article of manufacture using typical programming and/or engineering techniques to produce software, firmware, hardware, or any suitable combination thereof to control a computing device, such as a mobile handset, to implement the disclosed subject matter. The term "article of manufacture" as used herein is intended to encompass a computer program accessible from any suitable computer-readable device, media, or a carrier generated by such media/device. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave generated by a transmitter can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Furthermore, the terms to "infer" or "inference", as used herein, refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

FIG. 1 illustrates a block diagram of an example system 100 that provides efficient management of a wireless carrier tree 106 according to some aspects. System 100 can include a management component 102 that can receive a request to allocate a call to a wireless carrier of a mobile base station. The wireless carrier can include a mixed or integrated quality of service (QoS) carrier, serving applications with varying QoS requirements. A scheduling component 104 can assign the call to a portion of a wireless carrier tree associated with the wireless carrier based at least in part on a characteristic of the call. Accordingly, wireless carrier throughput can be increased and contention for resources of high demand and high quality calls can be reduced.

A wireless carrier, as used herein, can correspond to any suitable mobile communication technology in which a wireless carrier is broken up into multiple segments. Examples can include CDMA technology (e.g., utilizing multiple code segments), OFDM technology (e.g., utilizing multiple tone segments), time division multiple access (TDMA) technology (e.g., utilizing multiple time segments), or a combination of these or like technologies. Accordingly, the subject disclosure is not limited to CDMA technology, or OFDM technology, etc.

System 100 includes a wireless carrier tree 106 that has a predetermined amount of air transmission bandwidth (total bandwidth) and data transfer rate (data rate) for wireless transmission of information. The wireless carrier can be organized by a carrier tree (106) that subdivides the total bandwidth and data rate (e.g., see FIG. 3 and related discussion, infra). The carrier tree 106 is divided into multiple layers N, where N is an integer larger than zero (e.g., 1, 2, 3, etc.). Each layer has $2^{N-1}$ segments and each segment of a layer has bandwidth and/or data rate equal to $\frac{1}{2}^{N-1}$ of the total bandwidth/data rate. In addition, each layer corresponds to a spreading factor (SF) of $2^{N-1}$ (e.g., layer 1 corresponds to SF $2^0$ or SF1, layer 2 corresponds to $SF2^1$ or SF2, layer 3 corresponds to SF $2^2$ or SF4, and so on, see FIG. 3, infra). The received call request can be allocated to one or more segments of a carrier tree layer that provide a sufficient data rate and/or bandwidth for the call. For instance, if an SF16 segment of a carrier tree provides 100 kHz of bandwidth, and a circuit-switched voice call requires 12.5 KHz of bandwidth, 8 such circuit-switched voice calls can be allocated to the SF16. Specifically, each 12.5 KHz call can be allocated to one of eight SF128 segments of the SF16 segment, each SF128 segment have ⅛ of the 100 KHz bandwidth of the SF16 segment, or 12.5 KHz.

A wireless carrier has various segments at various layers of a wireless carrier tree 106, as described above. Scheduling component 104 can select an SF layer for the received call based on resource demand of the call (e.g., bit rate) and available resources of the wireless carrier tree 106. If a segment at a particular SF layer is available to meet the demand of a call, the call can be assigned to a segment on that SF layer. If the segment is not available at a requested SF layer, the call can be assigned to a higher SF layer, having lower resources, if suitable.

In addition, a segment of a particular SF layer can be selected based on a characteristic of the received call. For instance, the call can be assigned to an available segment starting from the right side of carrier tree 106 if it has a first characteristic. Alternatively, or in addition, the received call can be assigned to an available segment starting from the left side of carrier tree if the received call has a second characteristic. Furthermore, the received call can be assigned to a middle portion of the carrier tree 106 if it has a third characteristic or a fourth characteristic. For example, calls having the third characteristic can be assigned to a segment(s) starting at a right end of the middle portion of the carrier tree 106. Likewise, calls having the fourth characteristic can be assigned to a segment(s) starting from a left end of the middle portion of the carrier tree 106.

In accordance with at least one aspect, idle segments of the carrier tree 106 can be maintained in one or more predetermined portions of the carrier tree 106. For instance, idle segments can be maintained in one or more center segments at the center of the middle portion, discussed above. Alternatively, or in addition, one or more idle segments can be maintained at a left side portion of the carrier tree 106 and/or a right side portion of the carrier tree 106 (e.g., see FIG. 2, infra). Accordingly, idle segments can be maintained in the carrier tree 106 to provide additional support for calls of a particularly type.

As described above, scheduling component 104 can selectively assign a call to a portion of the wireless carrier tree 106 based on at least one characteristic of the call. Suitable characteristic of the call can include whether the call is a circuit-switched call or a packet-switched call. Further, a suitable characteristic can be QoS requirements, such as GBR, high priority service, medium priority service, and so on. Moreover, a suitable characteristic can be resource demand of a call, such as high bit rate or bandwidth. In other aspects, a suitable characteristic can be whether the call can support bursts of resources. For instance, a high demand, low priority call is often referred to as a 'bursty' call. The call does not require high data rates to be effective, but provides a better (e.g., faster) service when such data rates are available. Thus, 'bursty' applications (e.g., web-browsing and downloading traffic) can be provided extra resources or have resources reduced based on requirements of other calls (e.g., high quality calls, whether high data rate or low data rate).

According to other aspects of the subject disclosure, a suitable characteristic of the call can be a type of application or type of service associated with the call. For instance, scheduling component 104 can assign select a portion of the wireless carrier tree 106 based on whether the call is a voice call (e.g., circuit-switched call or VoIP call), a streaming data service, a guaranteed bit rate service, a web-browsing service, an e-mail service, a web download service, or a combination thereof or of the like. It should also be appreciated that wireless carrier tree 106 can correspond to an integrated or mixed-QoS carrier. Such an integrated carrier can provide service for at least two types of QoS calls, including circuit-switched voice calls, packet-switched VoIP calls, streaming data services, GBR calls, high demand low quality packet services (e.g., 'bursty' applications), or mid/low demand high quality packet services (e.g., VoIP), or like call types.

As described, system 100 provides for allocation of received calls to a wireless carrier tree 106 as a function of characteristic of the call(s). Such allocation can provide increased throughput for mobile base stations. In addition, the allocation can provide reduced contention for high quality and/or high demand packet services, enabling the mobile base station to service a larger number of concurrent high demand/quality calls.

Figure 2:
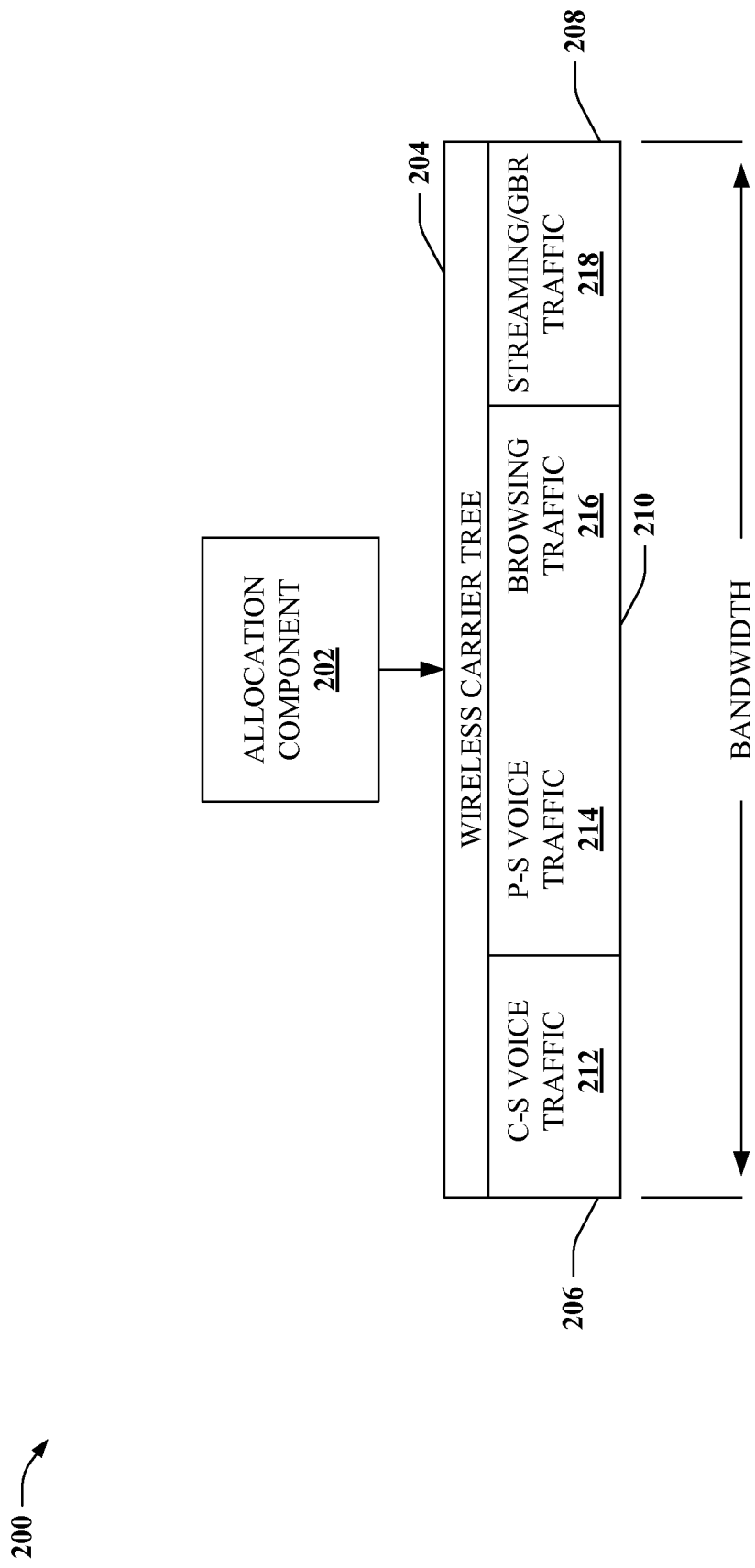
FIG. 2 depicts a block diagram of an allocation component that can designate portions of a wireless carrier tree to serve a predetermined type of traffic.

FIG. 2 depicts a block diagram of a system 200 that provides allocation of a portion(s) of a wireless carrier to various types of calls. System 200 can include an allocation component 202 that can designate portions (206, 208, 210) of a wireless carrier tree 204 to serve a predetermined type(s) of traffic (212, 214, 216, 218). In a particular example, traffic can be grouped together within the wireless carrier tree 204 as a function of resource demand and/or quality. Accordingly, services having similar data rates can be grouped together such that a dropped call of one service-type can more readily be replaced with a subsequent call of a similar service-type. Accordingly, fragmentation of carrier tree resources segments can be reduced, providing increased throughput and reduced resource contention.

Allocation component 202 can divide wireless carrier tree 204 into two or more portions (206, 208, 210). Each portion (206, 208, 210) can be designated for a particular type of call traffic (212, 214, 216, 218). Traffic can be segregated according to call service, call application, call quality, call demand, or a combination thereof or of the like. It should be appreciated that the two or more portions do not necessarily correspond with a like number of SF segments of the carrier tree (e.g., see FIG. 3, infra). For instance, a first portion can be allocated to a single SF64 segment of an SF8 segment (e.g., having eight SF64 segments) of the carrier tree 204 and a second portion can be allocated to seven remaining SF64 segments of the SF8 segment. The remaining seven SF8 segments of the carrier tree 204 can be allocated to a third type of traffic, or to multiple other types of traffic.

It should further be appreciated that various suitable organizations of a carrier tree 204 as a function of traffic type/call characteristic are incorporated herein. Because many such organizations can exist, only a few are specifically described. However, the subject disclosure should not be limited to the example embodiments articulated herein; rather, any suitable organization of carrier tree resources as a function of call characteristic(s), known to one of skill in the art or made known to one of skill in the art by way of the context provided by the disclosed embodiments, is incorporated into the subject disclosure.

In some aspects, allocation component 202 can generate three portions 206, 208, 210 of the wireless carrier tree 204 designated for four different types of traffic 212, 214, 216, 218. For instance, a left-most portion 206 of the carrier tree 204 can be designated for circuit-switched voice traffic 212. As another example, a right-most portion 208 of the carrier tree 204 can be designated for high quality high demand data traffic 218, including GBR traffic and traffic handling priority 1 traffic (THP1) (e.g., THP1 can be a highest priority traffic below GBR). The high quality data traffic can include streaming data traffic (e.g., streaming audio, streaming video) or like services that receive a benefit from a consistent bit rate, low jitter, and/or minimal or no packet loss.

According to additional aspects, allocation component can designate a third portion 210 of the wireless carrier tree 204 to a shared pool of resources. The shared pool can be designated for one or more types of traffic (214, 216). For instance, high demand low quality services can be designated for a right hand portion of the shared pool 210, adjacent to the high quality services 218 of the second portion 208. Further, low demand high quality packet services 214 (e.g., packet-switched voice traffic, or VoIP) can be designated to a left hand portion of the shared pool 210. As depicted, the low demand high quality packet services 214 could then be adjacent to the left-most portion 206 designated for circuit-switched voice traffic 212.

An arrangement as described above could enable designated resources of the carrier tree 204 to be shared amongst adjacent types of traffic. For instance, resources designated for packet-switched voice traffic 214 could easily be shared with circuit-switched voice traffic 212, or vice versa, to meet contemporaneous demand requirements. Likewise, high demand low quality traffic 216 can be shared with high quality high demand traffic 218, or vice versa, as contemporaneous demand requires.

The depicted arrangement can be suitable to providing reduced fragmentation and reduced contention of high quality resources. Specifically, high demand traffic is generally designated for the right portion of the carrier tree 204, whereas low demand traffic is generally designated for the left portion of the carrier tree 204. Thus, applications on the left side and right side of carrier tree 204 can often have similar data rates. Accordingly, random incoming traffic can more likely be filled as a result of call drops in nearby segments of the carrier tree 204. In addition, because high quality low demand traffic 216 is typically least impacted by loss of data rate resources, the right hand portion of the shared pool 210 of resources can be allocated to streaming traffic 218 as needed, with minimal impact. When streaming traffic 218 volume is low, additional data resources can be shared from the dedicated pool (or, e.g., from the middle or left hand side of the shared pool 210 when low demand packet volume is low), to provide exceptionally high data rates for the high demand low quality traffic 216 (e.g., 'bursty' applications).

According to one or more additional embodiments, idle segments of the carrier tree 204 can be grouped into one or more portions (206, 208, 210). For instance, by scheduling high quality high demand traffic 218 starting from the right end of the right-most portion 208, idle segments can be maintained at the left end of the right-most portion 208. Thus, such idle segments can be readily shared with the high demand low quality traffic 216, where suitable. In addition, by scheduling circuit-switched voice traffic 212 starting from the left end of the left-most portion 206, idle segments can be maintained at the right end of the first portion 206. Thus, idle segments of the left-most portion 206 can be readily shared with the low demand high quality traffic 214. Alternatively, or in addition, by scheduling high demand low quality traffic 216 starting from the end of the shared pool 210, and low demand high quality traffic 214 from the left end of the shared pool 210, idle segments within the shared pool can be maintained in a central region of such shared pool 210. Such idle segments could be readily allocated to the high demand low quality traffic 216 or low demand high quality traffic 214, as suitable.

It should be appreciated that the convention described above, utilizing left-most and right-most sides of the carrier tree 204 or portions thereof (206, 208, 210) are for contextual purposes only. A carrier tree is an organizational mechanism to applicable to a common resource, such as bandwidth or data rate of a particular wireless carrier. Accordingly, the depictions and descriptions of a carrier tree and segments or portions of the carrier tree provided herein (e.g., carrier tree 204 and portions 206, 208, 210) are utilized in this context, and the subject disclosure should not be limited by the convention. Rather, such depictions and descriptions are to be accorded a scope commensurate with an understanding of one of skill in the art that results from the context provided herein.

Figure 3:
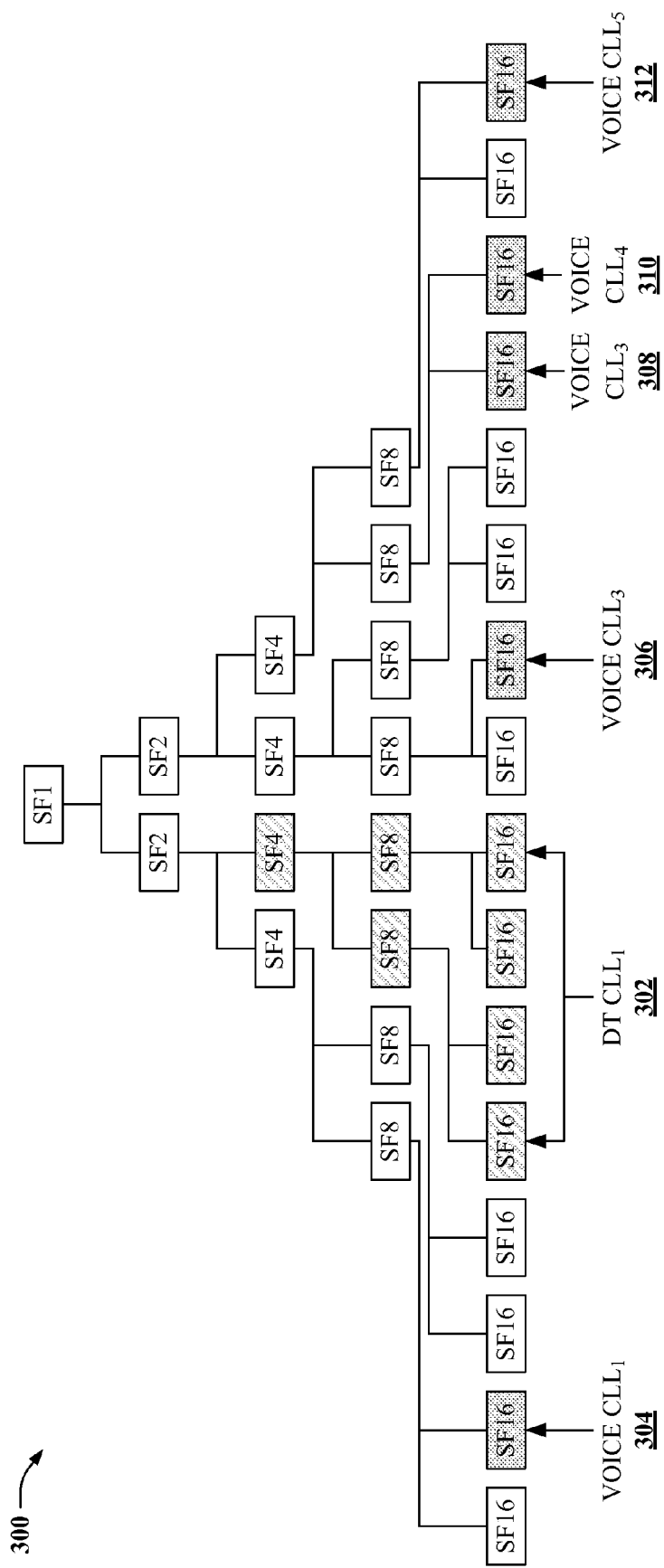
FIG. 3 illustrates an example of a segmented integrated wireless carrier tree according to some aspects.

FIG. 3 illustrates an example of a segmented integrated wireless carrier tree 300 according to some aspects. Wireless carrier 300 is depicted as having five layers, each layer having $2^{N-1}$ segments of SF $2^{N-1}$ and each segment corresponding to substantially $\frac{1}{2}^{N-1}$ of the total bandwidth and data rate of the wireless carrier 300A. Thus, if wireless carrier 300 has 10 KHz of bandwidth, the SF1 segment would have $\frac{1}{2}^0$*10 KHz, or 10 KHz of bandwidth, each SF2 segment would have substantially $\frac{1}{2}^1$*10 KHz, or 5 KHz of bandwidth, each SF4 segment would have substantially $\frac{1}{2}^2$*10 KHz, or 2.5 KHz of bandwidth, and so on.

As depicted, a data call (302) and several voice calls (304, 306, 308, 310, 312) are currently assigned to wireless carrier tree 300. Data call 302 utilizes four SF16 segments of the wireless carrier, which is substantially equivalent to one SF4 segment. The five voice calls (304, 306, 308, 310, 312) each utilize a single SF16 segment apiece (e.g., fixed data rate circuit-switched voice calls). As is immediately apparent, the SF16 layer (layer 5) of the wireless carrier tree 300 is highly fragmented. A total of seven idle SF16 segments exist, corresponding to nearly half of the bandwidth of the carrier tree 300. While it is true that seven additional SF16 voice calls can be readily assigned to wireless carrier tree 300, because a single call requires adjacent segments where multiple segments service the call, no additional SF4 data calls can be allocated to the carrier tree 300. This is in spite of the fact that the carrier tree 300 has overall bandwidth capable of supporting on additional SF4 data call (302), as well as an additional SF8 and SF16 calls.

Segmentation of integrated carriers (300), therefore, can lead to reduced throughput. In particular, carrier tree capacity for high demand calls (e.g., high bandwidth, high data rate), which typically correspond to higher-end service plans, is significantly reduced. Thus, calls potentially providing a higher revenue stream per resource are disproportionately hindered by fragmentation. Conventionally, calls are allocated starting from one end of the carrier tree 300 to an opposite end, until the carrier tree 300 is full. As calls drop out, other calls are re-allocated to newly idle segments so long as resource requirements of adjacent segments are sufficient to support such calls. For circuit-switched voice calls, fragmentation is only a minor issue in regard to throughput, because such calls can often be serviced by lowest resource segment of a carrier tree (e.g., often a SF32, SF64, SF128 or even larger SF segment). Thus, circuit-switched calls can often be serviced by any idle segment; adjacent segments of larger SF segments are not necessary. However, packet-switched data can often correspond to vastly different data rates, utilizing various adjacent segments of a carrier tree 300. Thus, by packing calls as a function of call characteristic, such as demand, quality, service, etc., calls of substantially like data rates can be grouped together within a carrier tree reducing the impact of fragmentation, and increasing overall throughput.

Figure 4:
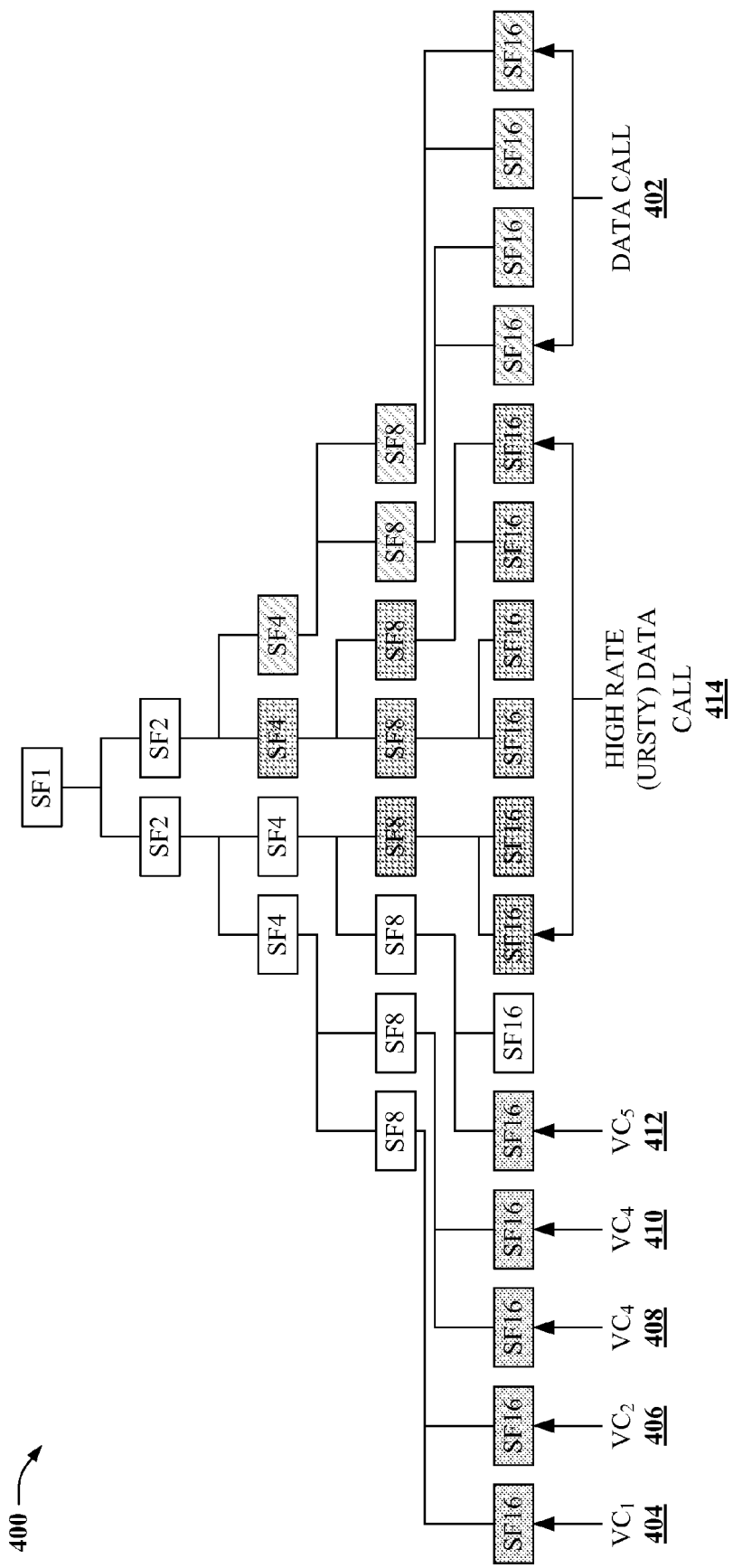
FIG. 4 depicts an example of an integrated wireless carrier tree packed as a function of traffic type according to further aspects.

FIG. 4 depicts an example of an integrated wireless carrier tree 400 packed as a function of traffic type according to further aspects of the subject disclosure. As depicted, a high quality data call 402 is at the right-most end of the SF16 row of segments. Voice calls 404, 406, 408, 410, 412 are assigned starting from the left-most end of the SF16 row of segments. As compared with FIG. 3, a stark contrast results from packing calls as a function of traffic type. For instance, if one or more of the voice calls (404, 406, 408, 410, 412) drops out, little or no effect occurs on the high quality data call 402.

In addition to the foregoing, carrier tree 400 can support a high rate low quality data call 414 allocated to one SF4 segment (and its corresponding sub-segments) and an SF8 segment (and its corresponding sub-segments) of the carrier tree 400. By packing voice and data calls at opposite ends of the carrier tree 400, much greater throughput is provided for carrier tree 400 as compared with carrier tree 300. In addition, if either of the data calls drops out, little impact on the throughput of carrier tree 400 results.

As a particular example of the foregoing, if data call 402 drops out, a subsequent SF4 data call, or 2 SF8 data calls, or 4 SF16 data calls can e allocated to the idle segments that result from such occurrence. Alternatively, or in addition, the high rate low quality data call 414 can e allocated extra resources if the high quality data call drops 402 drops out. Further, if any of the voice calls (404, 406, 408, 410, 412) drop out, the idle segments can readily be allocated to new voice calls, or to an additional data call (414), or such segments can be shared with the current high rate low quality data call 414, or a suitable combination thereof. As depicted, even if none of the other currently supported calls drop out, high rate low quality data call 414 can be provided another SF16 segment (e.g., the idle segment between the $VC_5$ 412 and the high rate low quality call 414). As will be described in more detail below, carrier tree (400) segments can be dynamically re-allocated to different types of data, as suitable to concurrent traffic demand. Further, supported calls can be re-packed within the carrier tree 400. Accordingly, the subject disclosure provides added flexibility in managing carrier tree 400 resources to meet spontaneous call demand requirements in addition to increasing throughput and reducing high quality call contention.

Figure 5:
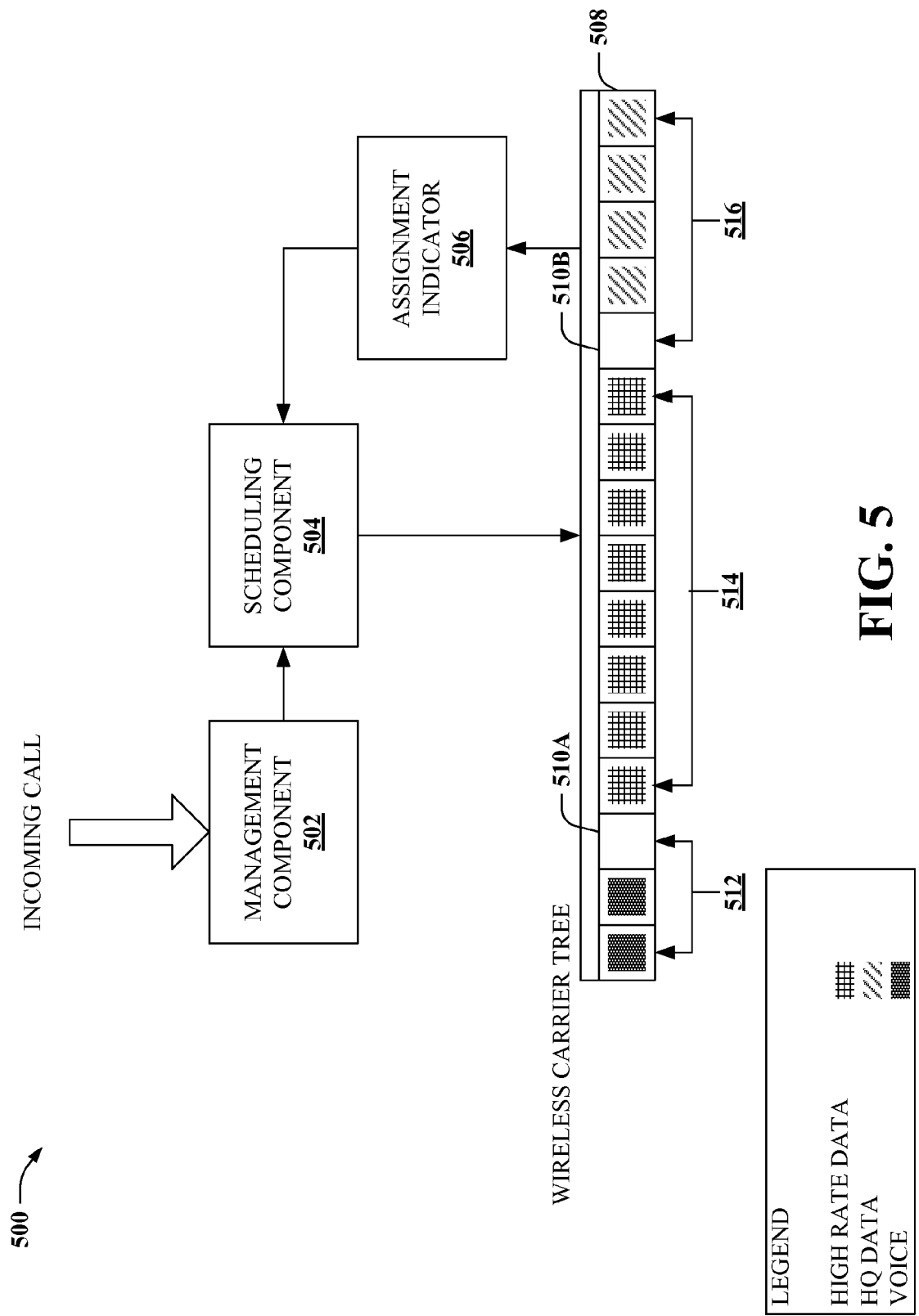
FIG. 5 illustrates a block diagram of a sample system that can identify fragmented segments of a wireless carrier tree according to some aspects.

FIG. 5 illustrates a block diagram of a sample system 500 that can identify fragmented segments 510A, 510B of a wireless carrier tree 508 according to some aspects. Identification can be done real time to reduce non-utilized idle segments when other calls are waiting for wireless transmission resources of a mobile base station. Accordingly, system 500 provides a mechanism to provide increased throughput of a mobile base station.

As depicted, system 500 includes a management component 502 that receives an incoming call to a wireless carrier (508) of a mobile base station (not depicted). In addition, a scheduling component 504 can assign the incoming call to a portion of the wireless carrier 508 based at least in part on a characteristic of the call, as described herein. Furthermore, system 500 can include an assignment indicator 506 that identifies a free block (510A, 510B) of the wireless carrier 508 and/or identifies a sub-division (512, 514, 516) of the wireless carrier 508 associated with the free block (510A, 510B). Assignment indicator 506 can parse segments of the carrier tree 508 to determine which segments are actively supporting calls and which segments are idle (510A, 510B). Idle segments can be provided to scheduling component 504 in conjunction with processing the incoming call.

According to further aspects, the scheduling component 504 assigns a call to a free block identified by the assignment indicator 506. Assignment can be based at least in part on whether a characteristic of the call (e.g., service, quality, resource demand, service, or a combination thereof or of the like) matches a characteristic of a sub-division 512, 514, 516 of the carrier tree 508. As depicted by FIG. 5, three sub-divisions 512, 514, 516 are identified. The sub-divisions can be allocated to one or more call characteristics. For instance, sub-division 512 can be allocated to voice calls. Sub-division 514 can be allocated to high rate data calls (e.g., 'bursty' traffic), and/or sub-division 516 can be allocated to high quality calls (e.g., streaming video). It should be appreciated that any combination of two or more sub-divisions (512, 514, 516) can be allocated for a carrier tree 508, and the example provided by FIG. 5 is not limited to the displayed embodiment(s).

Scheduling component 504 can identify pertinent characteristics of an incoming call and match the characteristics to identified sub-divisions 512, 514, 516. Thus, in the depicted example, if the incoming call is a voice call, scheduling component 504 can assign the call to idle segment 510A. Alternatively, in some embodiments, idle block 510A can be re-allocated to high data rate traffic if the incoming call is a high data rate call. Further, if the incoming call is a high quality data call, scheduling component 504 can schedule such call to idle segment 510B. Accordingly, system 500 can dynamically identify idle segments 510A, 510B and characteristics of such segments 510A, 510B. Further, system 500 can readily appropriate such segments 510A, 510B to calls waiting to be served, decreasing latency for such calls.

Figure 6:
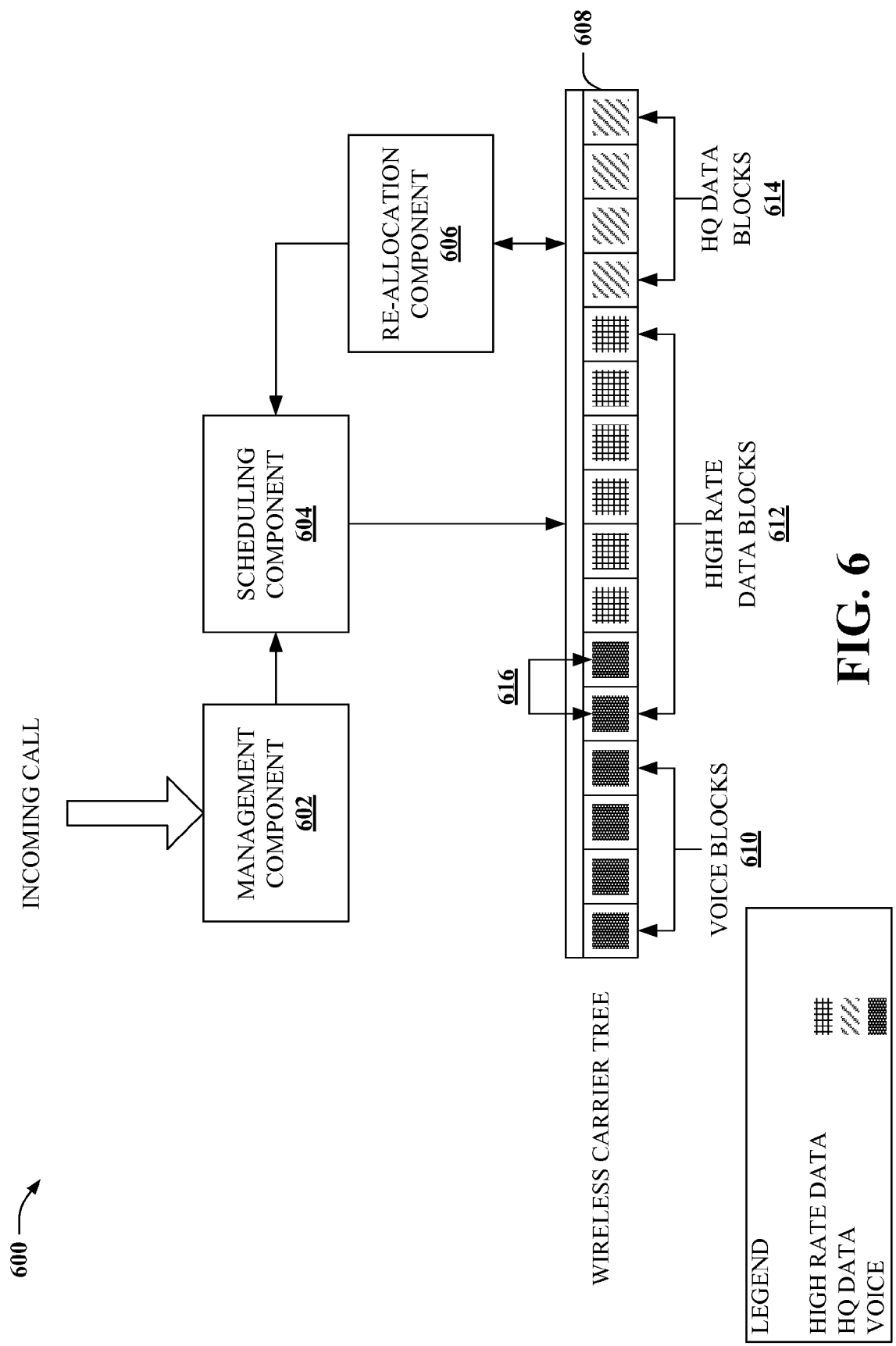
FIG. 6 depicts a block diagram of a sample system that can re-allocate portions of a wireless carrier tree to varying types of traffic according to further aspects.

FIG. 6 illustrates a block diagram of a sample system 600 that can re-allocate portions (610, 612, 614) of a wireless carrier tree 608 to varying types of traffic according to further aspects. By re-allocating segments (616) apportioned to one type of traffic (610, 612, 614), contemporaneous demand in other types of traffic can be managed more efficiently. Accordingly, system 600 can provide further increased efficiency and throughput of mobile base stations.

System 600 can include a management component 602 that can receive incoming call requests and a scheduling component 604 that can schedule such calls to the wireless carrier tree. In addition, system 600 can include a re-allocation component 606 that temporarily configures one or more segments of the wireless carrier 608 allocated to service a first type of traffic to serve a second type of traffic. For instance, one or more segments 616 allocated to a high data rate block of traffic 612 can be re-allocated to service voice traffic. Likewise, segments (616) allocated to serve voice traffic (610) or high quality data traffic (614) can be re-allocated to service high rate data traffic, and so on. Re-allocation component 606 can receive information from management component 602 related to characteristics of traffic being received by system 600. Re-allocation component 606 can then adjust allocation of segments (616) of the carrier tree to support incoming traffic demands. Accordingly, system 600 can provide flexibility for handling various fluctuations in incoming call demand, as a function if characteristics of such incoming calls.

Figure 7:
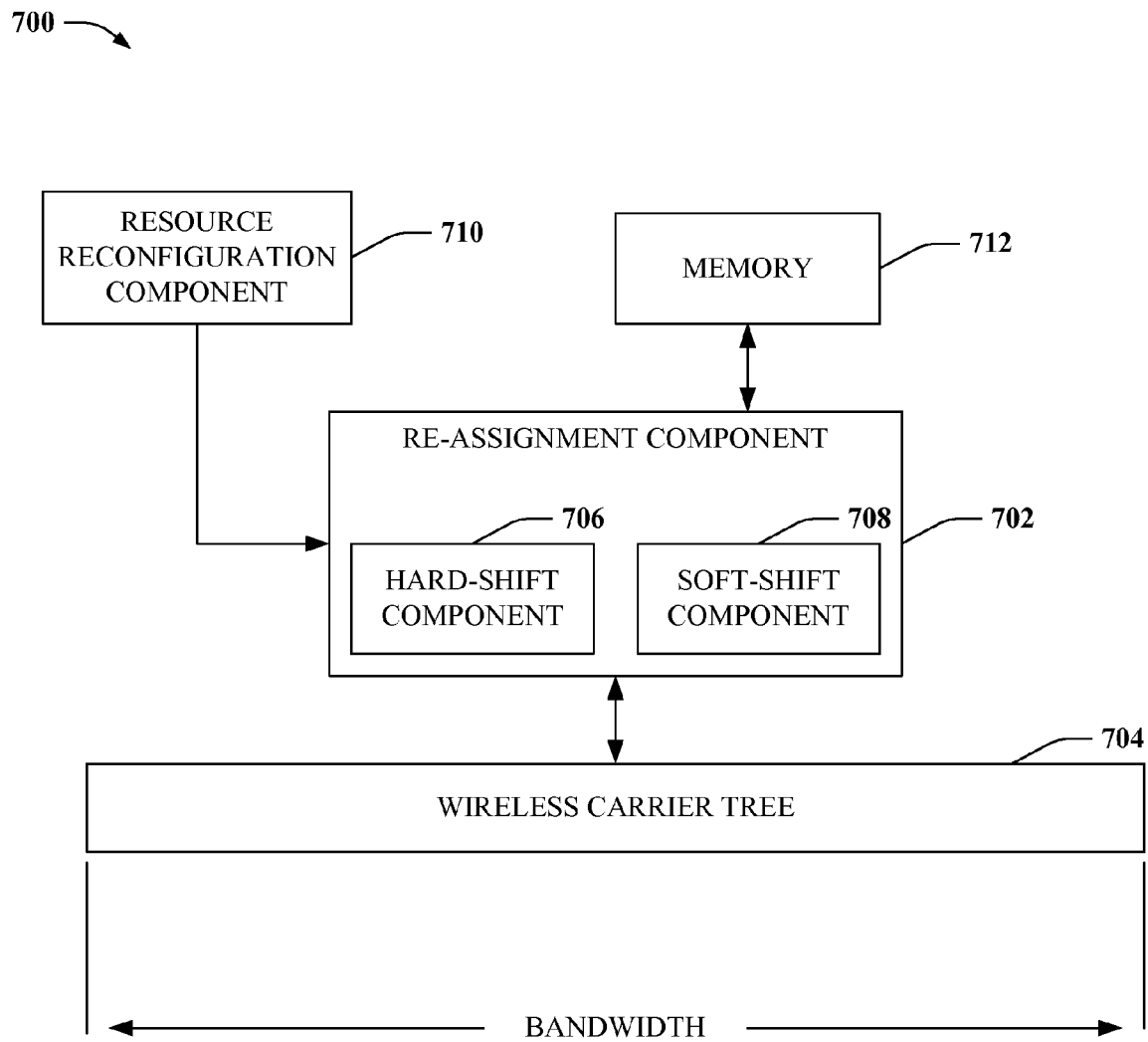
FIG. 7 illustrates a block diagram of a sample system that can re-pack a wireless carrier tree according to one or more aspects.

FIG. 7 illustrates a block diagram of a sample system 700 that can re-pack a wireless carrier tree 704 according to one or more aspects. As calls drop in and out of the wireless carrier tree 704, causing fragmentation, existing calls can be re-packed into contiguous segments. Accordingly, idle segments are grouped into one or more adjacent portions of the carrier tree 704 providing increased support for higher demand data calls, increasing mobile base station throughput.

System 700 includes a re-assignment component 702 that can shift a call(s), once assigned, from one portion of the wireless carrier 704 to a second portion of the wireless carrier. As an example, as depicted at FIG. 3 and FIG. 4, fragmented voice blocks (304, 306, 308, 310, 312) can be re-packed into a contiguous segment of voice blocks (404, 406, 408, 410, 412). In addition, data calls (302) can be re-packed from a portion of the carrier tree 300 to another portion, such as the right-most portion depicted at FIG. 4. As a result, idle segments are grouped into a contiguous bundle providing greater support for high data rate calls (e.g., high rate data call 414).

Re-assignment component 702 can include a hard-shift component 706 that can re-pack existing calls in the carrier tree 704 in a manner analogous to a hard handoff in a mobile cell or between mobile cells. As an example, to shift a call via hard shift, hard-shift component 706 can open a second segment of the carrier tree (e.g., a target idle segment(s)), and copy information associated with the call from the assigned portion to the second segment of the carrier tree 704. Hard-shift component 706 can then reconfigure a radio bearer and/or radio resource associated with the second segment to serve the call. (E.g., to accomplish providing a new code assignment for the call in a CDMA environment or a new tone assignment for the call in an OFDM environment, and so on). Further, the hard-shift component can close the assigned segment in conjunction with shifting the call, rendering the assigned segment idle. Call information can be copied by hard-shift component 706 to memory 712 in conjunction with the hard-shift, to mitigate likelihood of dropping the call during the shift.

In addition, re-assignment component 702 can include a soft-shift component 708 that can re-pack existing calls in the carrier tree 704 in a manner analogous to a soft handoff in a mobile cell or between mobile cells. As an example, soft-shift component 708 can move a call from an assigned SF segment(s) (e.g., SF16 segment) to a lower SF segment(s) (e.g., SF8 segment) in conjunction with shifting the call (e.g., to accomplish providing a new code or tone assignment for the call). By soft-shifting the call, data is not erased from the carrier tree during shifting; instead, the data is copied from one segment to another until the data reaches a target segment, mitigating likelihood of dropping the call.

System 700 can also include a resource reconfiguration component 710 that can select between a hard intra-carrier shift and a soft intra-carrier shift based on the characteristic of the call or a status of portions of the wireless carrier between the assigned portion and the second portion. For instance, if the call is to be moved within a block allocated to a common call characteristic (e.g., moved from one segment allocated to voice traffic to another segment allocated to voice traffic) a soft-shift can be utilized, which has a lower innate probability of dropping the call. If, however, various calls are allocated to segments between an existing segment and a target segment for the re-packing, a hard-shift can be utilized to reduce need to re-allocate calls served by intervening segments. Data associated with the call can be temporarily stored in memory 712 to reduce likelihood of the call being dropped. Accordingly, system 700 provides an enhancement to carrier tree (704) management that dynamically enables like traffic to be contiguous to like traffic, and idle segments to be dynamically grouped in one or more contiguous portions (e.g., as depicted at FIG. 4).

Figure 8:
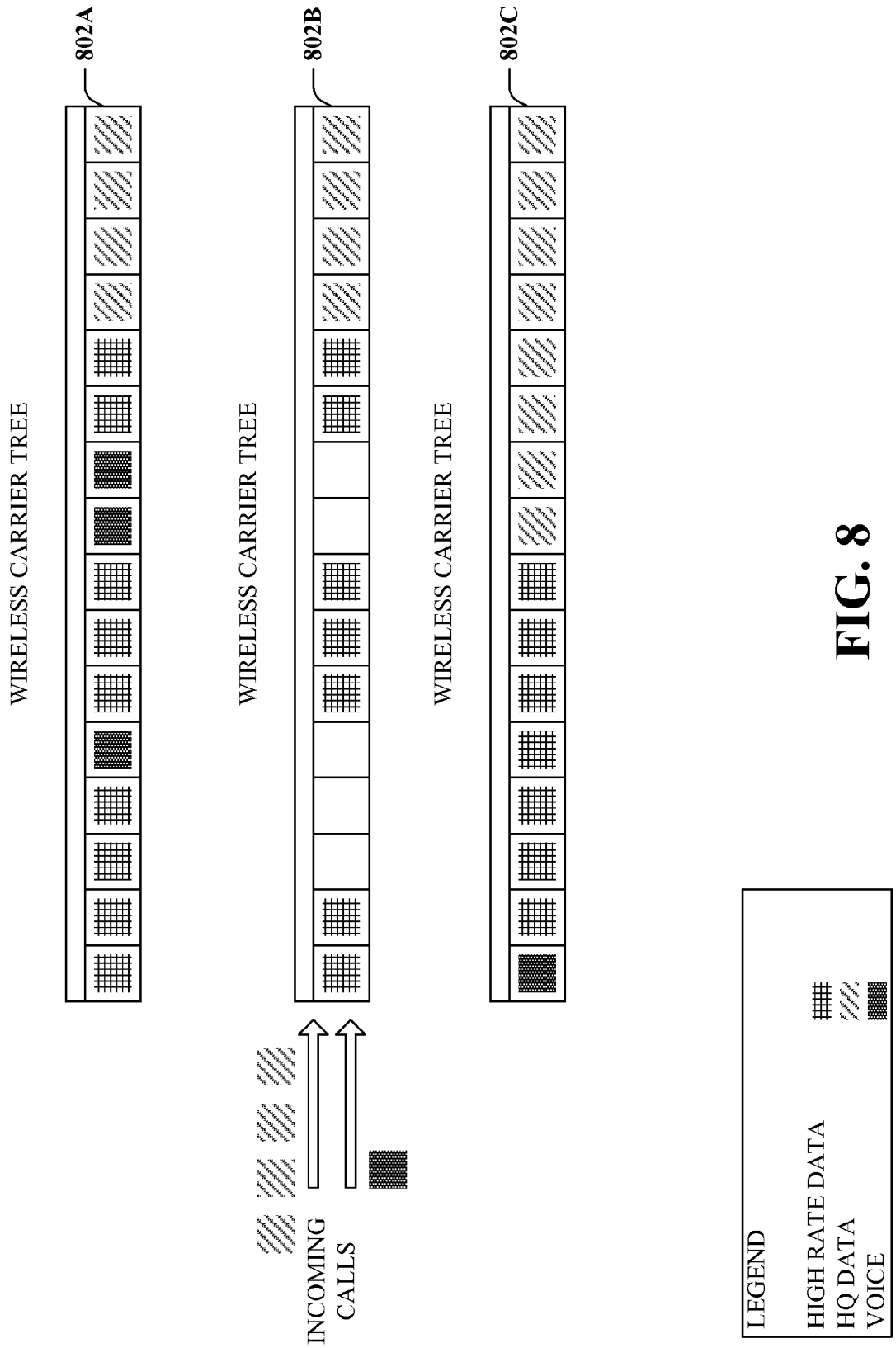
FIG. 8 depicts an example of re-packing a fragmented wireless carrier tree according to at least one aspect.

FIG. 8 depicts an additional example of re-packing a fragmented wireless carrier tree (802A, 802B, 802C) according to at least one aspect. Carrier tree 802A is fully packed with existing calls, including voice calls in single segments, and data calls in multiple contiguous segments. At 802B, three voice calls drop out, as well as one data call utilizing two adjacent segments. Thus, carrier tree 802B depicts a fragmented carrier tree, having 5 idle segments. Two incoming calls are also received at carrier tree 802B, a single segment voice call and a quad-segment high quality data call. Although the voice call can be readily assigned to one of the idle segments, the high quality data call cannot be assigned to any segment, despite the fact that the carrier tree has sufficient idle segments to support both calls. Carrier tree 802C depicts a re-packed tree (802C) that can support both calls with contiguous idle segments. The high rate data call traffic is re-packed into a single contiguous segment, rendering a sufficient number of idle contiguous segments to support the quad-segment high quality data call. In addition, the voice call is allocated to the left-most segment, to fully pack the carrier tree 802C. Accordingly, although the fragmented carrier tree 802B did not have sufficient contiguous resources to support the high quality data call, by re-packing existing calls in a manner that groups the idle segments into a contiguous group(s), the carrier tree can be fully packed, as depicted at 802C.

The aforementioned systems have been described with respect to interaction between several components, modules and/or mobile network functions. It should be appreciated that such systems and components/modules/functions can include those components or sub-components specified therein, some of the specified components or sub-components, and/or additional components. For example, a system could include management component 102, scheduling component 104, wireless carrier tree 106, and re-assignment component 308, or a different combination of these and other components. Sub-components could also be implemented as components communicatively coupled to other components rather than included within parent components. Additionally, it should be noted that one or more components can be combined into a single component providing aggregate functionality. For instance, management component 602 can include re-allocation component 606, or vice versa, to facilitate identifying characteristics of incoming calls and identifying freed-up segments and/or characteristics of associated portions of a carrier tree containing such segments by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 9:
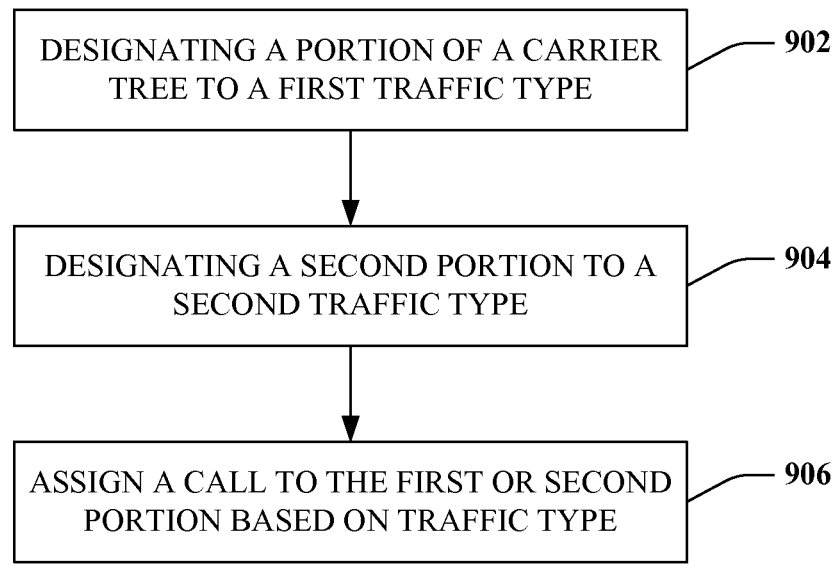
FIG. 9 depicts a sample methodology for allocating an integrated wireless carrier tree as a function of traffic type according to one or more aspects described herein.
Figure 10:
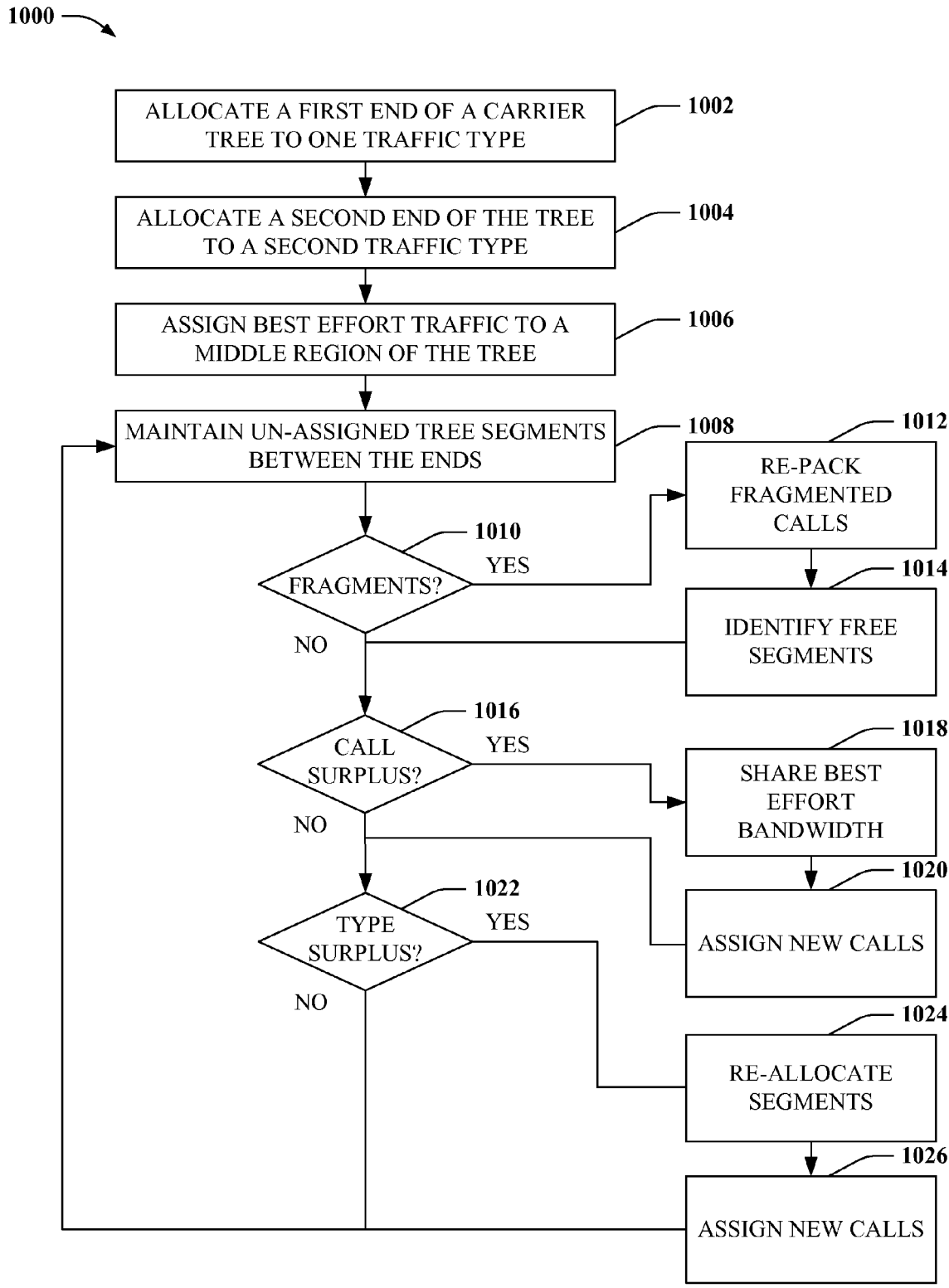
FIG. 10 depicts an example methodology for managing an integrated wireless carrier tree according to still other aspects.

In view of the exemplary systems described supra, methodologies that may be implemented in accordance with the disclosed subject matter will be better appreciated with reference to the flow charts of FIGS. 9-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, media, or a carrier in conjunction with such computer-readable device or media.

FIG. 9 depicts a sample methodology 900 for allocating an integrated wireless carrier tree as a function of traffic type according to one or more aspects described herein. At 902, method 900 can designate a portion of a carrier tree to a first traffic type. The carrier tree can be associated with a suitable mobile communication technology, such as CDMA, OFDM, TDMA, or suitable combination thereof or of the like. In addition, the portion can include two or more segments of the carrier tree of varying spreading factors, as described herein. Further, the portion can be designated for various types of traffic as a function of call quality, call demand, call application and/or call service, or a combination thereof.

At 904, method 900 can designate a second portion of the carrier tree to a second traffic type. The second portion can likewise include various segments of suitable spreading factors. In addition, in some embodiments, the second portion can be at an opposite end of the carrier tree from the first portion. The second traffic type can include a suitable combination of call quality, demand, service and/or application, different in at least one respect from the traffic type allocated to the first portion. At 906, an incoming call is assigned to the first portion of the carrier tree or the second portion of the carrier tree based on a type of traffic associated with the incoming call. For instance, if the incoming call is a voice call, the call can be allocated to the first or second portion depending on which portion is most closely related to voice calls. Accordingly, by allocating portions of the carrier tree to particular calls, fragmentation can be reduced, and idle segments can be maintained in contiguous portions of the carrier tree, providing increased throughput for an associated mobile base station.

FIG. 10 depicts an example methodology 1000 for managing an integrated wireless carrier tree according to still other aspects. At 1002, a first end of the wireless carrier tree can be allocated to a first type of traffic. At 1004, a second end (e.g., opposite the first end) of the wireless carrier tree can be allocated to a second type of traffic. At 1006, method 1000 can assign best effort traffic (e.g., low quality 'bursty' traffic) to a middle region of the carrier tree. Accordingly, resources of the carrier tree in the middle region assigned to the 'bursty' traffic, which is minimally impacted by fluctuating data rates, can be shared with the first type of traffic or the second type of traffic at the ends of the carrier tree.

At 1008, un-assigned tree segments can be maintained at one or more portions of the middle region, between the ends of the carrier tree. At 1010, method 1000 can make a determination as to whether fragmentation of the carrier tree has occurred. If fragmentation has occurred, method 1000 can proceed to 1012. If no fragmentation has occurred, method 1000 can proceed instead to 1016.

At 1012, calls can be re-packed within the carrier tree to reduce or eliminate carrier tree fragmentation. Re-packing can be performed with a hard-shift intra-carrier handoff, or a soft-shift intra-carrier handoff. In addition, method 1000 can select between hard-shift and soft-shift based on characteristics of shifted calls, characteristics of nearby calls and/or status of intervening segments between an assigned segment and a target segment. At 1014, free segments can be identified and optionally a portion of the carrier tree in which the free segments reside can also be identified.

At 1016, method 1000 can make a determination as to whether surplus calls have been received over and above available resource requirements of the carrier tree. If such surplus calls have been received, method 1000 can proceed to 1018, where best effort data resources (e.g., bandwidth and/or data rate) can be shared/reduced to provide support for the surplus calls. At 1020, method 1000 can assign the surplus calls to the shared/reduced portions of the carrier tree, if suitable.

At 1022, method 1000 can make a determination as to whether a surplus of calls of a particular traffic type has been received. If not, method 1000 can return to reference number 1008 where un-assigned tree segments, if any, can be maintained and/or re-allocated to the middle region of the carrier tree. If surplus calls of a particular type have been received, method 1000 can proceed to 1024 where idle segments allocated to a different traffic type are re-allocated to the particular surplus traffic type. At 1026, method 1000 can assign the new calls of the surplus traffic type to the re-allocated idle segments. Method 1000 can then proceed to reference number 1008. As described, method 1000 provides various mechanisms to intelligently manage a carrier tree to reduce fragmentation, increase overall carrier tree throughput, and reduce contention of resources for high quality traffic calls. Accordingly, substantial benefit is derived by such mechanisms in implementing mobile carrier base station resources.

Figure 11:
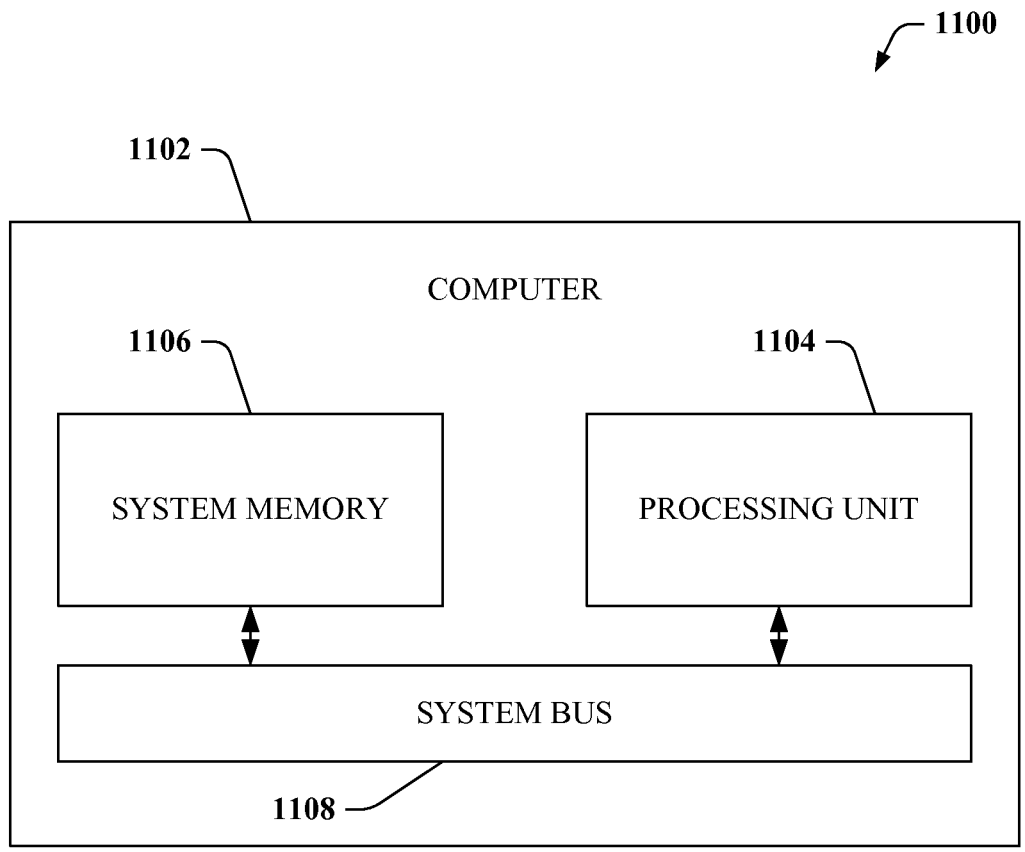
FIG. 11 illustrates a block diagram of an example operating environment that can perform electronic processing and communication functions described herein.

Referring now to FIG. 11, there is illustrated a block diagram of a computer 1102 operable to manage wireless carrier resources of a mobile base station. In order to provide additional context for various aspects of the claimed subject matter, FIG. 11 and the following discussion are intended to provide a brief, general description of a suitable computing environment 1100 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer (1102) typically includes a variety of computer-readable media. Computer-readable media can be any available media that can be accessed by the computer and includes both volatile and non-volatile media, removable and non-removable media. By way of example, and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data, optionally in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Suitable combinations of the any of the above should also be included within the scope of communication media derived from computer-readable media and capable of subsequently propagating through electrically conductive media, (e.g., such as a system bus, microprocessor, data port, and the like) and/or non-electrically conductive media (e.g., in the form of radio frequency, microwave frequency, optical frequency and similar electromagnetic frequency modulated data signals).

With reference again to FIG. 11, the exemplary environment 1100 for implementing various aspects includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors, such a single core processor, a multi-core processor, or any other suitable arrangement of processors. The system bus 1108 can be any of several types of bus structure that can further interconnect to a memory bus (with or without a memory controller), a peripheral bus, and a local bus using any of a variety of commercially available bus architectures. The system memory 1106 can include read-only memory (ROM), random access memory (RAM), high-speed RAM (such as static RAM), EPROM, EEPROM, and/or the like. Additionally or alternatively, the computer 1102 can include a hard disk drive, upon which program instructions, data, and the like can be retained. Moreover, removable data storage can be associated with the computer 1102. Hard disk drives, removable media, etc. can be communicatively coupled to the processing unit 1104 by way of the system bus 1108.

The system memory 1106 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1102 through one or more wired/wireless input devices, such as a keyboard, pointing and clicking mechanism, pressure sensitive screen, microphone, joystick, stylus pen, etc. A monitor or other type of interface can also be connected to the system bus 1108.

The computer 1102 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1102 can connect to other devices/networks by way of antenna, port, network interface adaptor, wireless access point, modem, and/or the like.

The computer 1102 is operable to communicate with any suitable wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to other devices, including a data network such as the Internet, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

What has been described above includes examples of the claimed subject matter. It is, of course, not possible to describe every conceivable combination of components or methodologies for purposes of describing the claimed subject matter, but one of ordinary skill in the art can recognize that many further combinations and permutations of such matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a memory to store executable instructions; and
   a processor coupled to the memory that facilitates execution of the executable instructions to perform operations, comprising:
      receiving a request to allocate a call to a carrier device of a wireless carrier;
      assigning the call to an end portion of a code tree assigned to the wireless carrier based at least in part on a characteristic of the call, wherein the code tree has a first end portion and a second end portion; and
      maintaining un-assigned blocks in a portion of the code tree between the first end portion and the second end portion.

2. The system of claim 1, wherein the operations further comprise shifting the call from the end portion of the code tree to which the call is assigned to another portion of the code tree.

3. The system of claim 2, wherein shifting the call comprises selecting between a hard intra-carrier shift and a soft intra-carrier shift based on the characteristic of the call.

4. The system of claim 3, wherein the operations further comprise, in response to selecting the hard intra-carrier shift, opening the second portion, copying information associated with the call from the end portion to which the call is assigned to the other portion, and closing the end portion.

5. The system of claim 1, wherein the operations further comprise assigning data traffic classified as best effort traffic to the portion of the code tree between the first end and the second end.

6. The system of claim 5, wherein the operations further comprise dynamically sharing bandwidth associated with the data traffic classified as best effort traffic with the call assigned to the end portion.

7. The system of claim 1, wherein the operations further comprise sub dividing the code tree into a set of portions, wherein the portions of the set are respectively configured to serve different traffic having respectively different characteristics.

8. A method, comprising:
   receiving, by a system comprising a processor, a request to allocate a call to a network device of a wireless carrier;
   assigning, by the system, the call to an end portion of a code tree assigned to the wireless carrier based at least in part on a characteristic of the call, wherein the code tree has a first end portion and a second end portion; and
   maintaining, by the system, un-assigned blocks in a portion of the code tree between the first end portion and the second end portion.

9. The method of claim 8, further comprising shifting, by the system, the call from the end portion of the code tree to which the call is assigned to another portion of the code tree.

10. The method of claim 9, wherein shifting the call comprises selecting between a hard intra-carrier shift and a soft intra-carrier shift based on the characteristic of the call.

11. The method of claim 10, further comprising, in response to selecting the hard intra-carrier shift, opening, by the system, the second portion, copying, by the system, information associated with the call from the end portion to the other portion, and closing, by the system, the end portion.

12. The method of claim 8, further comprising assigning, by the system, data traffic categorized as best effort traffic to the portion of the code tree between the first end and the second end.

13. The method of claim 12, further comprising dynamically sharing, by the system, bandwidth associated with the data traffic with the call assigned to the end portion.

14. The method of claim 1, further comprising sub dividing, by the system, the code tree into a set of portions configured to serve respective traffic respectively having a different characteristic.

15. A computer-readable storage device having instructions stored thereon that, in response to execution, cause a system comprising a processor to perform operations, comprising:

receiving a request to allocate a call to a device of a wireless carrier;

assigning the call to an end portion of a code tree assigned to the wireless carrier based at least in part on a characteristic of the call, wherein the code tree has a first end portion and a second end portion; and maintaining un-assigned blocks in a portion of the code tree between the first end portion and the second end portion.

16. The computer-readable storage device of claim 15, wherein the operations further comprise shifting the call from the end portion of the code tree to another portion of the code tree.

17. The computer-readable storage device of claim 16, wherein shifting the call comprises selecting between a hard intra-carrier shift and a soft intra-carrier shift based on the characteristic of the call.

18. The computer-readable storage device of claim 17, wherein the operations further comprise, in response to selecting the hard intra-carrier shift, opening the second portion, copying information associated with the call from the end portion to the other portion, and closing the end portion.

19. The computer-readable storage device of claim 15, wherein the operations further comprise assigning best effort data traffic to the portion of the code tree between the first end and the second end.

20. The computer-readable storage device of claim 19, wherein the operations further comprise dynamically sharing bandwidth associated with the best effort data traffic with the call assigned to the end portion.

* * * * *